United States Patent [19]

Tajima et al.

[11] Patent Number: 4,660,160

[45] Date of Patent: Apr. 21, 1987

[54] ELECTRONIC WEIGHING DEVICE HAVING LABEL PRINTER WITH DATA STABILITY CHECK

[75] Inventors: Noriyasu Tajima; Kunihiko Aoba; Hidemi Mihara, all of Mishima, Japan

[73] Assignee: Tokyo Electric Co., Ltd., Tokyo, Japan

[21] Appl. No.: 724,651

[22] Filed: Apr. 18, 1985

[30] Foreign Application Priority Data

Apr. 26, 1984 [JP] Japan .................................. 59-85905

[51] Int. Cl.[4] ..................... G01G 23/10; G01G 23/38; G06F 11/00
[52] U.S. Cl. .................................. 364/567; 364/734; 177/2; 177/185
[58] Field of Search ........................ 177/184, 185, 2; 364/734, 567

[56] References Cited

U.S. PATENT DOCUMENTS

| | | | |
|---|---|---|---|
| 4,102,421 | 7/1978 | Ozaki et al. | 177/185 |
| 4,347,903 | 9/1982 | Yano et al. | 364/734 X |
| 4,531,600 | 7/1985 | Langlais et al. | 177/185 |
| 4,553,619 | 11/1985 | Fujinaga | 177/1 X |

FOREIGN PATENT DOCUMENTS

| | | | |
|---|---|---|---|
| 0031702 | 7/1981 | European Pat. Off. | |
| 2626024 | 12/1977 | Fed. Rep. of Germany | 177/185 |
| 58-56090 | 12/1983 | Japan | |
| 1265231 | 3/1972 | United Kingdom | 177/185 |
| 1472375 | 5/1977 | United Kingdom | |
| 1537975 | 1/1979 | United Kingdom | |
| 1577484 | 10/1980 | United Kingdom | |
| 2100487 | 12/1982 | United Kingdom | |

Primary Examiner—George H. Miller, Jr.
Attorney, Agent, or Firm—Frishauf, Holtz, Goodman & Woodward

[57] ABSTRACT

An electronic weighing device comprises a weighing apparatus for generating weight data responsive to the weight of a load, a memory having a true value memory area and N data memory areas for time sequentially storing the weight data from this weighing apparatus in every sampling cycle, a display device for displaying at least the true value data stored in the true value memory area, and a control unit for storing into the true value memory area the true value data calculated by processing the weight data stored in the N data memory areas in accordance with a display blinking prevention process. When it is detected that the difference between the weight data derived in two successive sampling cycles is a predetermined value or more, the control unit inhibits the display blinking prevention process and stores into the true value memory area the true value data calculated on the basis of the weight data stored in the N data memory areas.

10 Claims, 15 Drawing Figures

FIG. 3
(PRIOR ART)

| | F | E | D | C | B | A | 9 | 8 | 7 | 6 | 5 | 4 | 3 | 2 | 1 | 0 | / | |
|---|---|---|---|---|---|---|---|---|---|---|---|---|---|---|---|---|---|---|
| | | | M4 | | | M3 | | M2 | | | M1 | | | MD | | 0 | |
| | | MC3 | MC2 | MC1 | | M8 | | | M7 | | | M6 | | M5 | | 1 | |
| | | | | FL | | MB | | MX | | MCX | | MT | | MS | | 2 | |
| | | | | | | | | | | | | | | | | 3 | |

FIG. 10

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | MD | | M6 | M1 | | M7 | M2 | | M8 | M3 | MC1 | MC2 | M4 | | |
| 1 | | M5 | | MT | | MCX | | MX | | | MB | | FL1 | MC3 | FL3 | |
| 2 | | MS | | | | | | | | | | | | FL2 | | |
| 3 | | | | | | | | | | | | | | | | |

ELECTRONIC WEIGHING DEVICE HAVING LABEL PRINTER WITH DATA STABILITY CHECK

BACKGROUND OF THE INVENTION

The present invention relates to an electronic weighing device having a label printer which prints the weight, unit price, total price, etc. on a label on the basis of weighing data, and issues the label.

Hitherto, as an electronic weighing device with a label printer, there is a weighing device of the type having a display blinking prevention function. This display blinking prevention function is to prevent the display of the weighing data from being changed when the weighing data fluctuates within a limited range due to noise. However, in this case, since the weighing data fluctuates in the initial state when, for example, an article is placed on the weighing device, the display data is kept unchanged due to the display blinking prevention function. Then, when this weighing data becomes stable, the display data corresponding to this stable weighing data is displayed. Therefore, in such a case, this electronic weighing device can be misunderstood such that its response speed is slow and further there is a possibility that the reliability of the electronic weighing device is suspected. In addition, in such a kind of electronic weighing device with a label printer, when an article has been put on the weighing device and the weighing data become stable, the label on which the weight, unit price and total price corresponding to this article were printed is issued. Consequently, for example, if a load weight is erroneously and instantaneously applied to the electronic weighing device, the weighing data momentarily becomes large but is returned to a predetermined value immediately thereafter. Thus, the label is issued although the displayed weighing data does not change at all, causing a further risk that the customer will feel an unnecessary suspicion.

SUMMARY OF THE INVENTION

It is an object of the present invention to provide an electronic weighing device with a label printer in which when a load weight over a predetermined value is applied to the weighing plate, the display blinking prevention function is canceled, thereby making it possible to display the weighing data responsive to a change in this load weight.

This object is accomplished by an electronic weighing device with a label printer comprising: a weighing apparatus for generating weight data corresponding to the weight of a load; a memory including a true value memory area and N data memory areas for time sequentially storing the weight data from this weighing apparatus in every sampling cycle; a display device for displaying at least the true value data stored in the true value memory area; and a control unit for storing into the true value memory area the true value data calculated by processing the weight data stored in the N data memory area in accordance with the display blinking prevention process and for storing into the true value memory area the weight data stored in a preset one of the N data memory areas as the true value data without executing the display blinking prevention process when it is detected that the difference between the weight data derived in the successive two sampling cycles is larger than a predetermined value.

In this invention, when the difference between the weight data derived in two successive sampling cycles becomes larger than a predetermined value, the display blinking prevention process is inhibited, so that the data corresponding to the weighing data is immediately displayed.

BRIEF DESCRIPTION OF THE DRAWINGS

FIG. 3 is a map of a RAM used in FIG. 2;

FIG. 10 is a map of a RAM used in FIG. 9;

DETAILED DESCRIPTION OF THE PREFERRED EMBODIMENT

Prior to describing an electronic weighing device with a label printer according to one embodiment of the present invention, a conventional electronic weighing device with a label printer will first be explained in further detail with reference to FIGS. 1 to 8.

Figure 1:
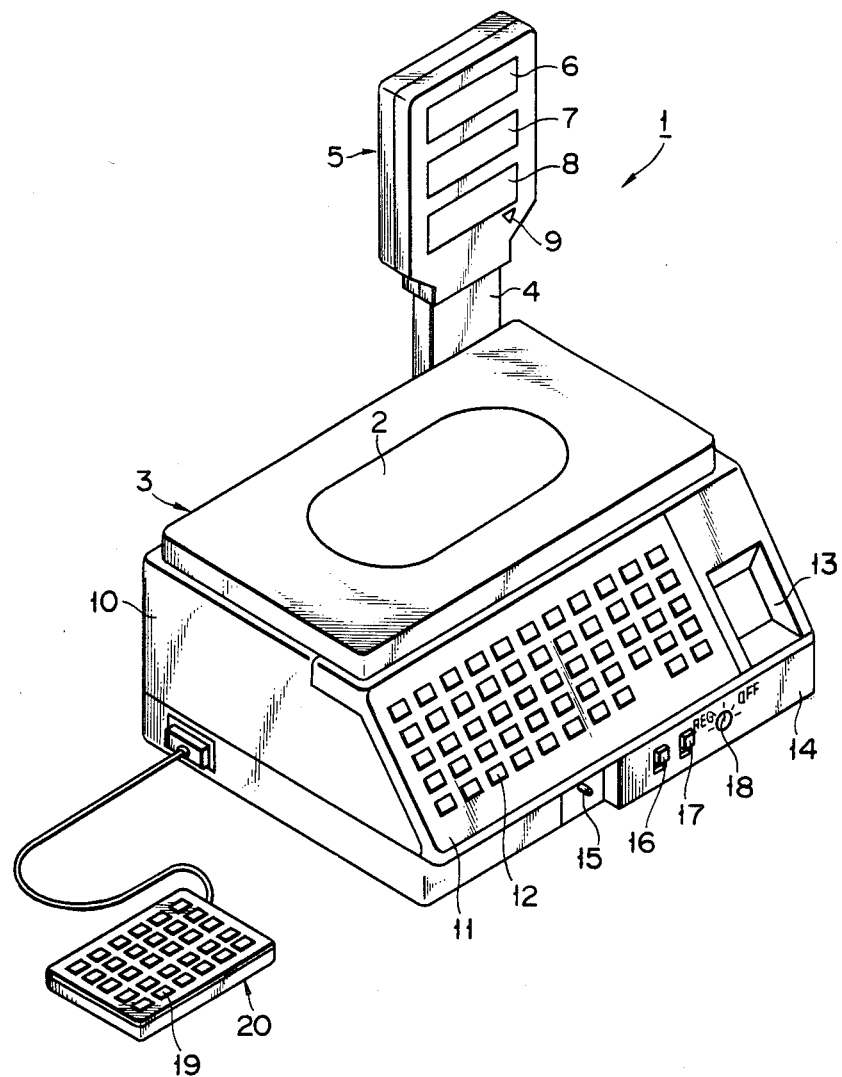
FIG. 1 is a perspective view of a conventional electronic weighing device.

FIG. 1 illustrates an external view of an electronic weighing device 1. This electronic weighing device has a weighing section 3 having a measuring plate 2 and a display unit 5 attached to the top end of a pole 4. The display unit 5 is similarly formed on both sides thereof and on each side it has a weight display section 6, a unit price display section 7, a price display section 8, and an error display lamp 9. On one hand, a front keyboard 11 is provided in front of a main body casing 10 of the weighing section 3. Various front keys 12 such as ten-key, clear key and the like are provided in the front keyboard 11. A receipt or label issuing port 13 is formed on the right side of the front keyboard 11. Also, a switch operating section 14 is provided in the lower portion of the front keyboard 11. The switch operating section 14 has a zero setting switch 15 of the weighing device, a label issuing mode selection switch 16 to change over AUTO/MANUAL modes, a label issuing mode selection switch 17 to change over WEIGHING-/FIXED PRICE modes, and a registration mode selection switch 18. The registration mode selection switch 18 can select a RAM CLEAR mode and a TEST mode in addition to the ordinary weighing operation and registration mode, OFF mode in that all displays are lit out and the machine is stopped, and the like. On one hand, a remote keyboard 20 having remote keys 19 such as numeral keys (including characters A to F) and the like is connected to the main body casing 10.

Figure 2:
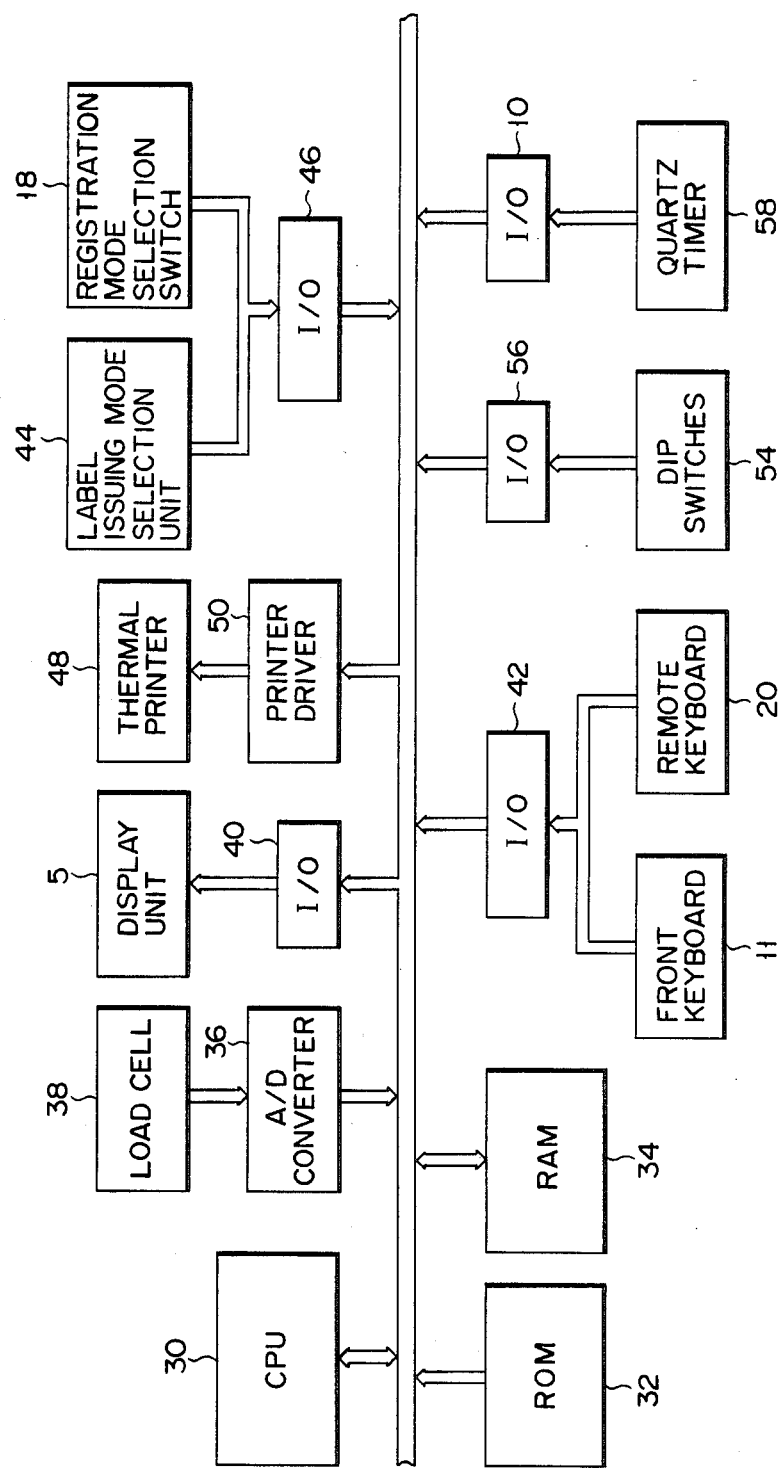
FIG. 2 is a block diagram of the electronic weighing device shown in FIG. 1.

FIG. 2 is a block diagram of the electronic weighing device 1 shown in FIG. 1. The electronic weighing device 1 comprises: a central processing unit (CPU) 30; a read only memory (ROM) 32 to store a program or the like which is executed by the CPU 30; a random access memory (RAM) 34 to temporarily store weighing data as will be mentioned later; and an A/D converter 36 to convert weight data from a load cell 38 to digital data. In addition, to the CPU 30, there are connected: the display unit 5 shown in FIG. 1 through an I/O port 40; the front and remote keyboards 11 and 20 through an I/O port 42; and the registration mode selection switch 18 and a label issuing mode selection unit 44 including the switches 16 and 17 through an I/O port 46. Further, to the CPU 30, there are coupled: a thermal printer 48 through a printer driver 50; dip switches 54 for selection of specifications such as display blanking specifications or the like through an I/O port 56; and a quartz timer 58 to generate time data indicative of year, month, day, etc. through an I/O port 60.

When the above-mentioned electronic weighing device 1 is explained simply, a unit price is set by inputting the unit price data from the front keys 12 or by calling the PLU data set in the RAM 34 and an article is weighed the load cell 38 thereby printing the unit price, weight and total price of this article on a label and then issuing the label.

FIG. 3 shows a map of the RAM 34, in which a memory area MD stores the weighing data (decimal five-digit count data 0 0 0 0 0 to 4 0 0 0 0) which was read out by the CPU 30 from the A/D converter 36. The CPU 30 on the other hand stores the newest eight sampling data into memory areas $M_1$ to $M_8$ by a data shifting method. Count memory areas $MC_1$ to $MC_3$ store the numeric data representing how many data which are equal to the data in the memory areas $M_1$ to $M_3$ exist in the memory areas $M_1$ to $M_8$, respectively. In the case where five or more identical sampling data exist in the successive eight sampling data, a memory area MS stores these sampling data as the stable data. A memory area MT stores a true value. The content in the memory area MT is used as the display data in the next post process. A memory area MCX stores the maximum numeric data in the foregoing memory areas $MC_1$ to $MC_3$. A memory area MX stores the sampling data in one of the memory areas $M_1$ to $M_3$ corresponding to the numeric data stored in the memory area MCX. A memory area MB temporarily stores the true value stored in the memory area MT in the previous operation cycle prior to executing the display blinking prevention process. A motion flag FL is a flag which is set when there is a difference over one scale (ten counts) between the present content of the memory area MT and the true value in the previous operation cycle stored in the memory area MB. When this motion flag FL is "1", the display unit 5 is set in the display blanking mode.

In such an arrangement, the operation of the CPU 30 will be explained on the basis of flowcharts shown in FIGS. 4 and 5. First, after starting the operation, the CPU 30 executes the initialization process by performing the memory clear operation, ROM check operation, I/O initialization, readout operation of the dip switches, etc. and thereafter the CPU 30 detects the state of the registration mode selection switch 18. A check is made here to see if the registration mode selecting switch 18 is in the OFF mode or not.

When it is assumed that the switch 18 is set in a mode other than the OFF mode, the process of "MAIN 0" is executed and a parity condition of the dip switches 54 is checked, then display segments of the display unit 5 are checked. In this case, the display of numerals "0" to "9" and the display blanking are repeated for each display digit. When the weighing data becomes stable, the CPU 30 checks the zero range of the weighing data and after checking the power stoppage, the CPU 30 executes the process of "MAIN" in FIG. 5.

Figure 4:
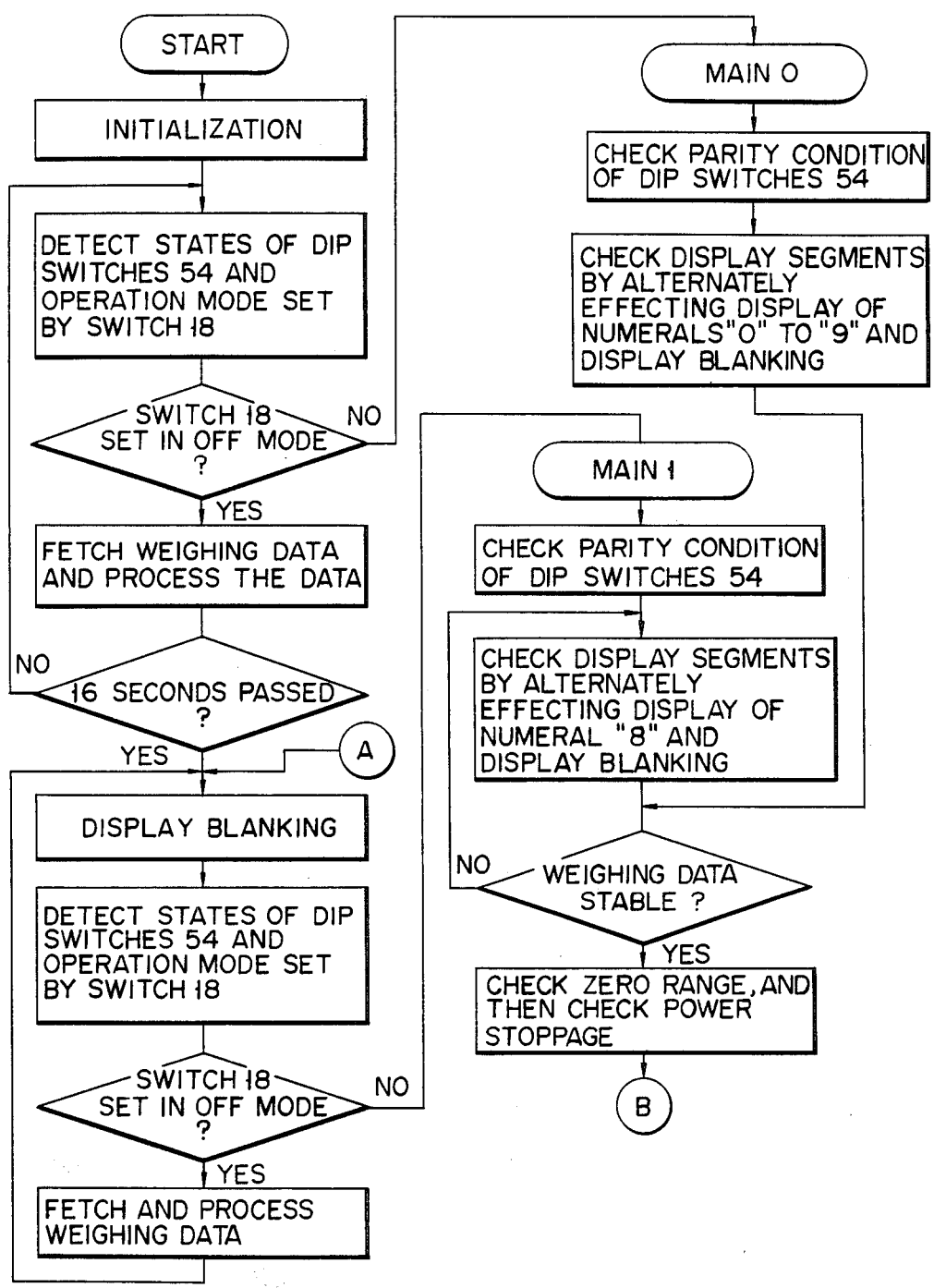
FIGS. 4 and 5 are flowcharts for explaining the operation of the electronic weighing device shown in FIG. 2.

In FIG. 4, when it is detected that the registration mode selection switch 18 is set into the OFF mode, the CPU 30 reads in the weighing data and processes this weighing data. When it is detected that sixteen seconds have passed from the start, the blanking of the display data is executed and then the CPU 30 detects the states of the dip switches 54 and checks again the state of the registration mode selection switch 18. When it is detected here that the switch 18 is set in the OFF mode, the CPU 30 reads out and processes the weighing data and then returns to the process for the display blanking. On the other hand, when it is detected that the registration mode selection switch 18 is set in a mode other than the OFF mode, the CPU 30 executes the process of "MAIN 1" and checks the parity condition of the dip switches 54 and then checks the display segments of the display unit 5. The segment check in this case is made by alternately and repeatedly effecting the display of a numeric value "8" and the display blanking. When the weighing data becomes stable, the CPU 30 checks the zero range and then checks the power stoppage; thereafter, it executes the process of "MAIN" in FIG. 5.

Subsequently, in the main routine shown in FIG. 5, the CPU 30 first checks the operation mode and then detects the states of the front switches 16 and 17. After completion of these operations, the state of the registration mode selection switch 18 is checked. When it is detected here that the switch 18 is set into the RAM clear mode or TEST mode, the CPU 30 executes the process corresponding thereto. On the other hand, when it is detected that the switch 18 is set in a mode other than those modes and is set in the OFF mode, the display blanking step in FIG. 4 is again executed. Unless the switch 18 is in the OFF mode, a check is made to see if key-in data has been inputted or not.

In the case where there is key-in data, a check is made to see if the key operated is the front key 12 or not. If it is the front key 12, the data process corresponding to this operated front key is performed; the content of this process is omitted here. On the contrary, unless the operated key is the front key 12, this key is discriminated to be the remote key 19, so that the data process corresponding to the remote key operated is carried out and the data responsive to the key-in data is displayed and at the same time the double check for the display data is performed.

On one hand, in the foregoing check about presence or absence of the key-in data, if it is detected that no key is operated, the CPU 30 fetches and processes the weighing data and performs the auto-zero process; thereafter, it checks the state of the registration mode selection switch 18. When it is detected that the switch 18 is set into the OFF mode, the process routine is returned to the display blanking step shown in FIG. 4. In the case where the switch 18 is set into a mode other than the OFF mode, the data indicative of date and time from the quartz timer 58 is read and stored into the RAM 34. Next, the CPU 30 checks to see if the net weight calculation is necessary or not on the basis of the key-in data in the RAM 34. If it is necessary, the CPU 30 calculates the gross weight and performs the auto clear and subtracts the tare from the gross weight to obtain the net weight and then checks the auto clear condition. Next, the CPU 30 checks the necessity of the price calculation on the basis of the key-in data in the RAM 34. If it is necessary, the CPU 30 performs the multiplication of the net weight and unit price, thereby determining the total price. The CPU 30 allows the various kinds of data calculated to be displayed and performs the double check for the display data and permits the time, unit price, weight, total price, etc. to be printed on a label and thereafter it again executes the check for the operation mode.

Figure 5:
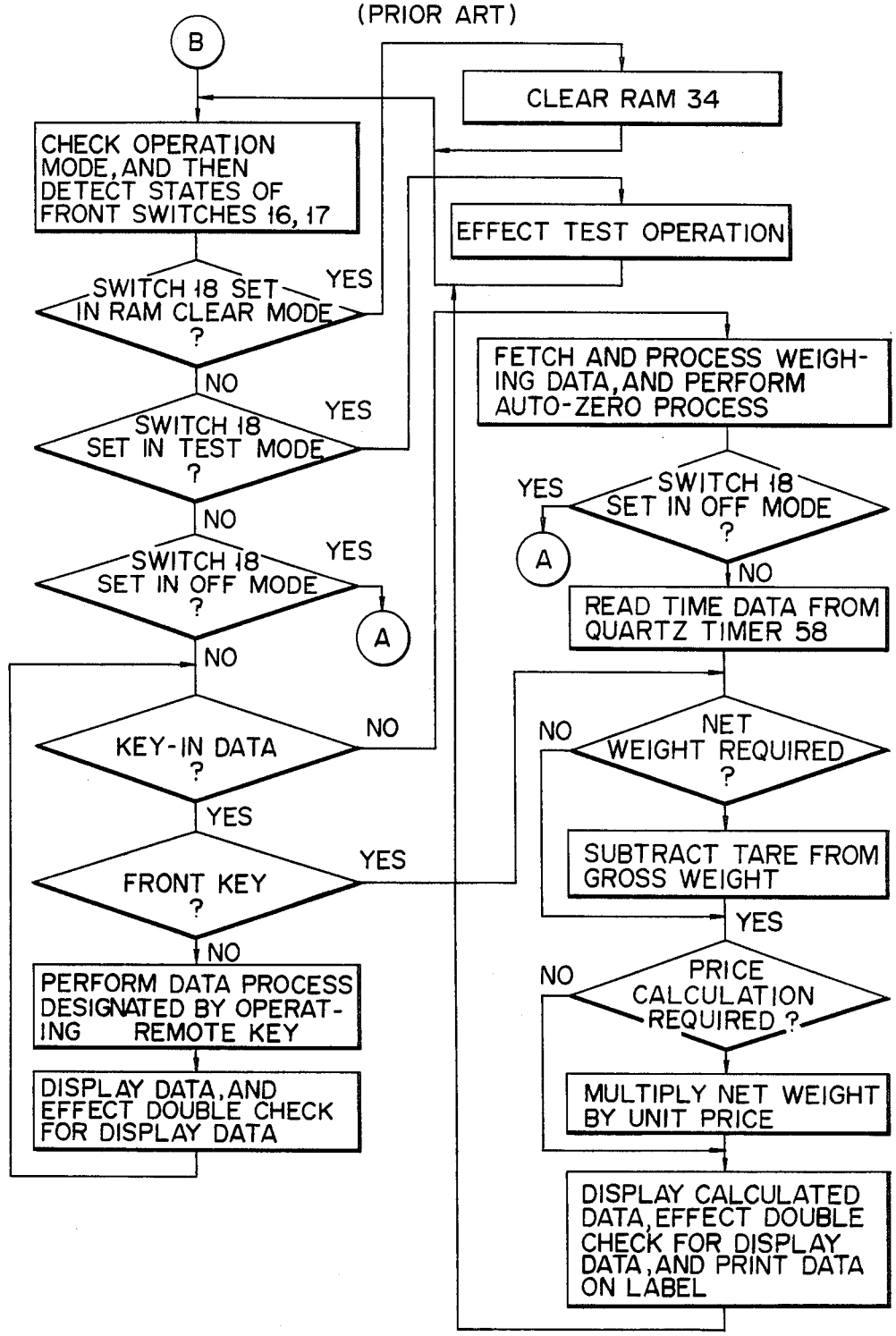
Figure 6:
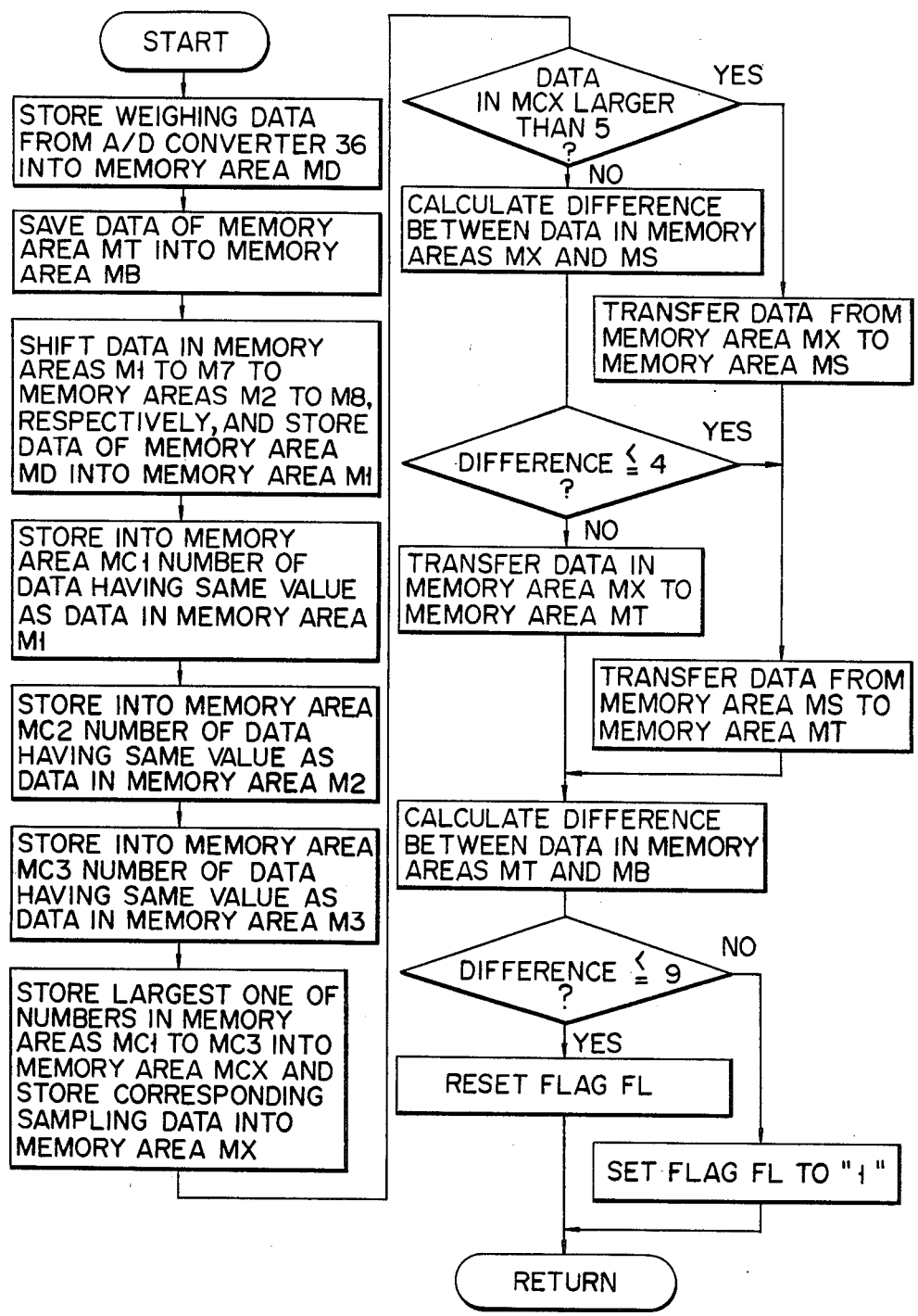
FIG. 6 is a flowchart for the display blinking prevention process which is executed by a CPU used in the electronic weighing device shown in FIG. 2.

The display blinking prevention process shown in FIG. 6 is included in the weighing data processing step effected after fetching the weighing data in the main flow in FIGS. 4 and 5. First, the newest weighing data generated from the A/D converter 36 is stored into the data memory area MD. This sampling is performed so as to produce one piece of data at every 200 ms. The true value in the memory area MT calculated in the display blinking prevention process in the previous cycle is saved into the memory area MB. On the other hand, in order to replace the contents of the memory areas $M_1$ to $M_8$ by the eight newest sampling data, the content of the oldest memory area $M_8$ is ignored and the data in the memory areas $M_1$ to $M_7$ are respectively shifted into the memory areas $M_2$ to $M_8$. Simultaneously, the newest data in the memory area MD is shifted into the memory area M1. The number of memory areas in which the same data as the data in the memory area $M_1$ has been stored among the memory areas $M_1$ to $M_8$ is counted and this counted data is stored in the memory area $MC_1$. Similarly, the number of memory areas in which the same data as the data in the memory areas $M_2$ and $M_3$ have been stored among the memory areas $M_1$ to $M_8$ is respectively counted and this counted data is stored in the memory areas $MC_2$ and $MC_3$, respectively. Next, the maximum count value among the count data stored in the memory areas $MC_1$ to $MC_3$ is stored into the memory area MCX. Simultaneously, the sampling data corresponding to this maximum count value is stored into the memory area MX. For example, if the count data stored in the memory area $MC_1$ is the maximum value, the data in the memory area $M_1$ is stored into the memory area MX. If the count data stored in the memory area $MC_2$ is the maximum value, the data in the memory area $M_2$ is stored into the memory area MX. If the count data stored in the memory area $MC_3$ is the maximum value, the data in the memory area $M_3$ is stored into the memory area MX. In the case where there are two or more maximum count data in the memory areas $MC_1$ to $MC_3$, the newest sampling data is preferentially used. Thereafter, the true value is obtained in dependence upon whether the content of the memory area MCX is five or more or not. First, if the content of the memory area MCX is "5" or more, the corresponding sampling data is regarded as the remarkably stable data, so that the data stored in the memory area MX is transferred into the memory area MS and is stored therein and the content transferred into the memory area MS is stored as the true value into the memory area MT. On the other hand, if the content of the memory area MCX is "4" or less, the difference between the data stored in the memory area MX and the stable data stored in the memory area MS is calculated. If this difference is five counts or more, it is determined such that there is a new change in weight, so that the data in the memory area MX is stored as the true value into the memory area MT. In the case where the content of the memory area MCX is "4" or less and the difference between the contents of the memory areas MX and MS is four counts or less, the data in the memory area MX is regarded as the fluctuating data, so that the data in the memory area MS is stored as the true value into the memory area MT in place of the data in the memory area MX. When the true value is stored into the memory area MT in this way, the difference between the previous true value stored in the memory area MB and the present true value in the memory area MT is calculated. If this difference is one scale (equal to ten counts, and corresponding to 2g, for instance) or more, the motion flag FL is set, so that the display blanking process is performed in regard to the load weight fluctuating. Such a display blinking prevention process is executed for every sampling.

Figure 7:
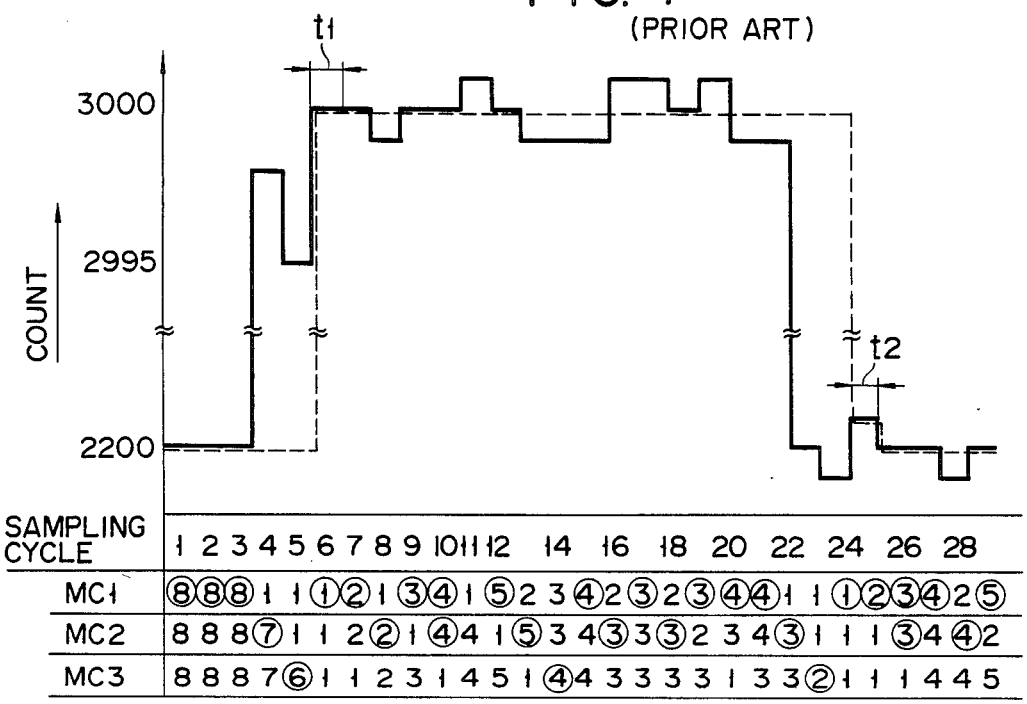
FIGS. 7 and 8 show variations in weighing data and display data in the cases where an article is put on the electronic weighing device and where a load weight is instantaneously applied to this electronic weighing device, respectively.
Figure 8:
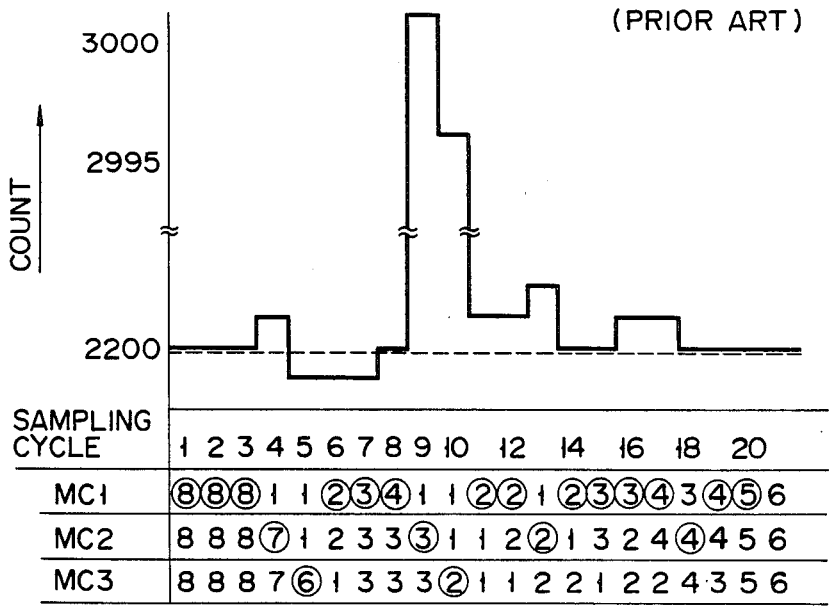

Now, the process shown in FIG. 6 will be considered with reference to FIG. 7 with regard to the case where an article is actually put on the measuring plate. In FIG. 7, an ordinate axis denotes the weighing data (count value) and an axis of abscissa represents the sampling cycle. In the diagram, a solid line indicates the variation in actual count value and a broken line shows the state of variation in true value calculated according to the display blinking prevention process. On one hand, the contents "1" to "8" of the memory areas $MC_1$ to $MC_3$ represent the number of the same data and the numeral surrounded by a circle indicates the count data which is stored in the memory area MCX. In this diagram, an article is put on the measuring plate in the sampling cycle "4" and the newest data "2998" is stored into the memory area M1. However, the data in the memory area MCX is "7" and the data "2200" stored in the memory area $M_2$ is stored as the true value into the memory area MX, so that the display condition is not changed. Although the contents of the memory areas $M_1$ and $M_2$ are respectively "2995" and "2998" even in the sampling cycle "5", the content of the memory area MCX is "6" ($\geq 5$) and the data "2200" in the memory area $M_3$ is stored into the memory area MS and is also used as the true value; therefore, the display condition is not changed. In the sampling cycle "6", the contents of the memory areas $M_1$, $M_2$ and $M_3$ are "3000", "2995" and "1" "2998"; the data in the memory area $MC_1$ to $MC_3$ are all the content of the memory area MCX is "1" (<5); the content "3000" of the memory area $M_1$ is stored into the memory area MX; and the difference between the content of this memory area MX and the content "2200" of the memory area MS is over five counts. Consequently, the content "3000" of the memory area MX is set as the true value. At this time, since the difference between the true value "2200" previously derived and the true value "3000" obtained in this cycle is over ten counts, so that the motion flag FL is set. Therefore, for the true value in the sampling cycle "6", the displaying blanking mode is set, so that the display is not performed. In FIG. 7, time $t_1$ indicates this display blanking interval. In the next sampling cycle "7", the contents of the memory areas M1, M2 and M3 are "3000", "3000" and "2995"; the content of the memory area MCX is "2"; and the difference between the contents of the memory areas MX and MS is still over five counts. Thus, the content "3000" of the memory area MX is set as the true value. In this case since the difference between the true value "3000" obtained previously and the true value "3000" derived at this time is below nine counts, the motion flag FL is reset and from this time point the display of weight and the like corresponding to the true value "3000" is performed. Such processes are continued and, for instance, in the sampling cycle "12", when the contents of the memory areas $MC_1$ and MCX become "5", the sampling data derived at this time is regarded as the stable data. Thus, the content "3000" of the memory area MX is stored into the memory area MS and this value is set as the true value. Subsequently, in the sampling cycle "14", the content of the memory area MCX is below "4" and the difference between the content "2999" of the memory area MX and the content "3000" of the memory area MS is below four counts, so that it is considered that this difference is caused due to the fluctuating data near "3000" and the content "3000" of the memory area MS is set to the true value and then the display becomes stable. Thereafter, the similar processes are performed. Even if the article is now removed in the sampling cycle "22", the value in the memory area $MC_2$ is effectively transferred into the memory area MCX, so that the true value in the memory area MT is still "3000" and the display condition is not changed. This is the same in the sampling cycle "23". In the sampling cycle "24", the content of the memory area MCX is below "4" and the difference between the content "2201" of the memory area MX and the content "3000" of the memory area MS is over five counts, so that the content "2201" of the memory area MX is stored as the true value into the memory area MT. In this case, since the difference between the true value "3000" obtained previously and the true value "2201" derived at this time is over ten counts, the motion flag FL is set to "1" and the display blanking is executed. In the diagram, time $t_2$ represents this display blanking interval. In the next sampling cycle "25", the motion flag FL is reset and the weight display and the like corresponding to the true value "2200" are performed. As described above, the display is carried out on the basis of the change in true value; therefore, the display is stably performed without being affected by the fluctuating data or the like, so that the display blinking is prevented. However, in this method, the memory area MCX is managed using the three memory areas $MC_1$ to $MC_3$. Therefore, the display condition varies in the sampling cycle "7" when an article is put on the measuring plate (in the sampling cycle "4") and this causes the time lag corresponding to three sampling cycles. This delay can cause the customer to feel that the response speed of this electronic weighing device is slow and therefore believe that the goods (and retailer) are inferior. This problem is also caused when removing the article. On the other hand, in an electronic weighing device with a label printer, there is a device of this type in which a change in weight over a certain constant level is used as one label issuing condition and when the weight change over the constant level occurs, the label is automatically issued. According to this method, in addition to the case where there is the weight change as shown in FIG. 7, even in the case where an instantaneous change in weight as shown in FIG. 8 occurs as the result of, for instance, a hand accidentally touching the weighing device or the like, the label is issued. However, even when large weight changes occur as shown in the sampling cycles "9" and "10" in FIG. 8, the contents of the memory areas $MC_2$ and $MC_3$ are merely sequentially stored into the memory area MCX and in this case, the true value "2200" in the memory area MT is still effective without being changed, so that the display condition is not changed. Thus, this causes a situation such that the label is issued although the display condition does not change, so that the customer could be distrustful and also hold an impression that the sensitivity of the weighing device is low. In addition, even in the normal weighing condition shown as an example in FIG. 7, the response speed is slow and therefore there is a possibility that the label would have been issued before the change in display occurs.

An electronic weighing device according to an embodiment of the present invention will than be described hereinbelow with reference to FIGS. 9 to 14.

Figure 9:
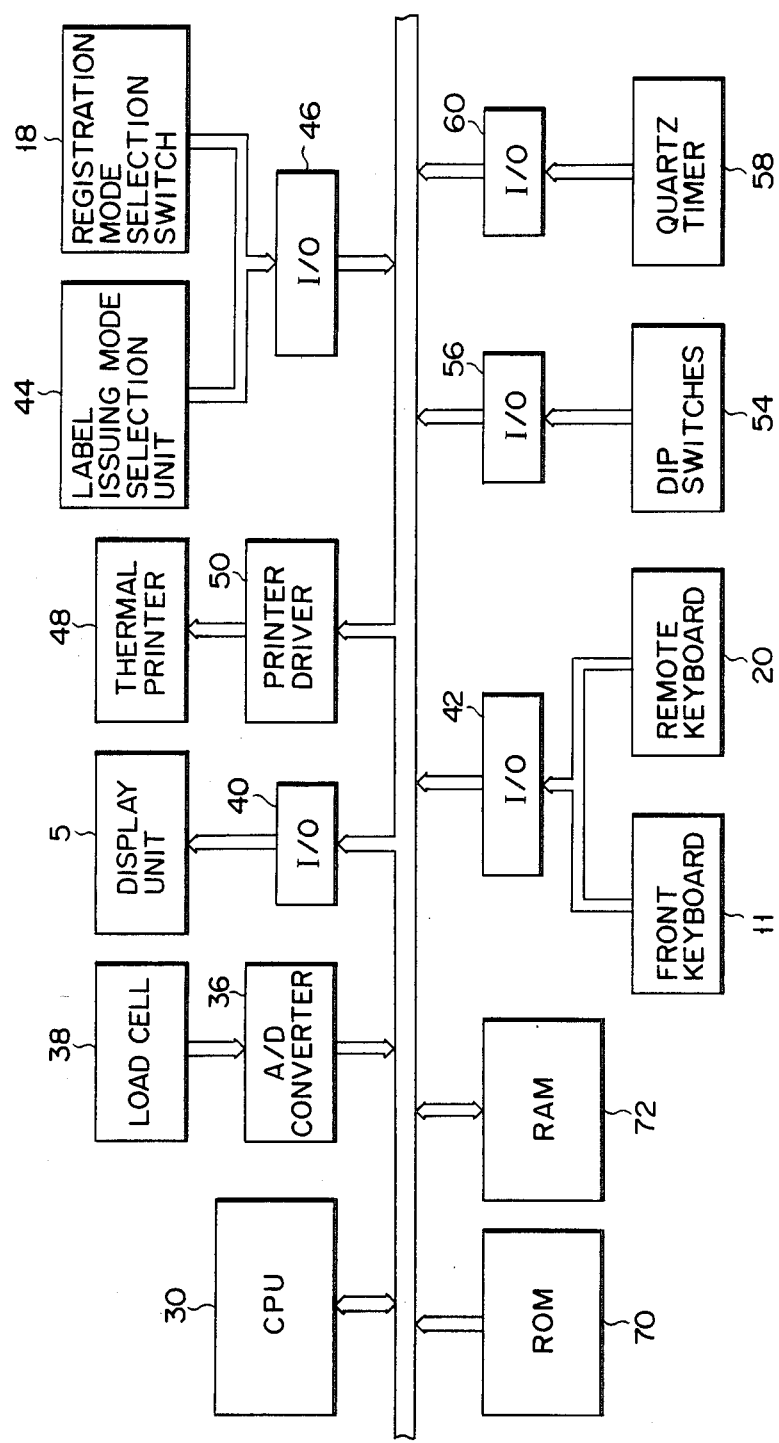
FIG. 9 is a block diagram of an electronic weighing device according to one embodiment of the present inven- tion.

As will be explained later, the electronic weighing device shown in FIG. 9 is constituted similarly to the electronic weighing device shown in FIG. 2 except that a ROM 70, in which the program oblained by modifying the program stored in the ROM 32 has been stored is used and a RAM 72 having the memory map obtained by modifying the memory map in the RAM 34 is used.

FIG. 10 shows the map in the RAM 72. This RAM 72 is constituted similarly to the RAM 34 shown in FIG. 3 except that a motion flag $FL_1$ is used in place of the motion flag FL and an interlock flag $FL_2$ and a flag $FL_3$ are further provided In addition, as mentioned above, the flag $FL_1$ is set to "1" when the weight data stored in the memory areas MB and MT are over one scale (equals ten counts and, for example, corresponds to 2g). Whether the display blanking is performed or not during a fluctuation of the weight is determined in dependence upon the content of this flag $FL_1$. However, in the case where this electronic weighing device is set so as not to have the display blanking function by way of the dip switches 54, the display data is not blanked even during the fluctuation of the weight.

When the difference between the weight data in the memory areas $M_1$ and $M_2$ is over eight scales (75 counts), the flag $FL_2$ is set to "1". When it is detected that the flag $FL_2$ is set to "1", the CPU 30 determines that the weight change is over a predetermined value. On one hand, the flag $FL_3$ denotes the state of the flag $FL_2$ in an immediately preceding sampling cycle.

Figure 11:
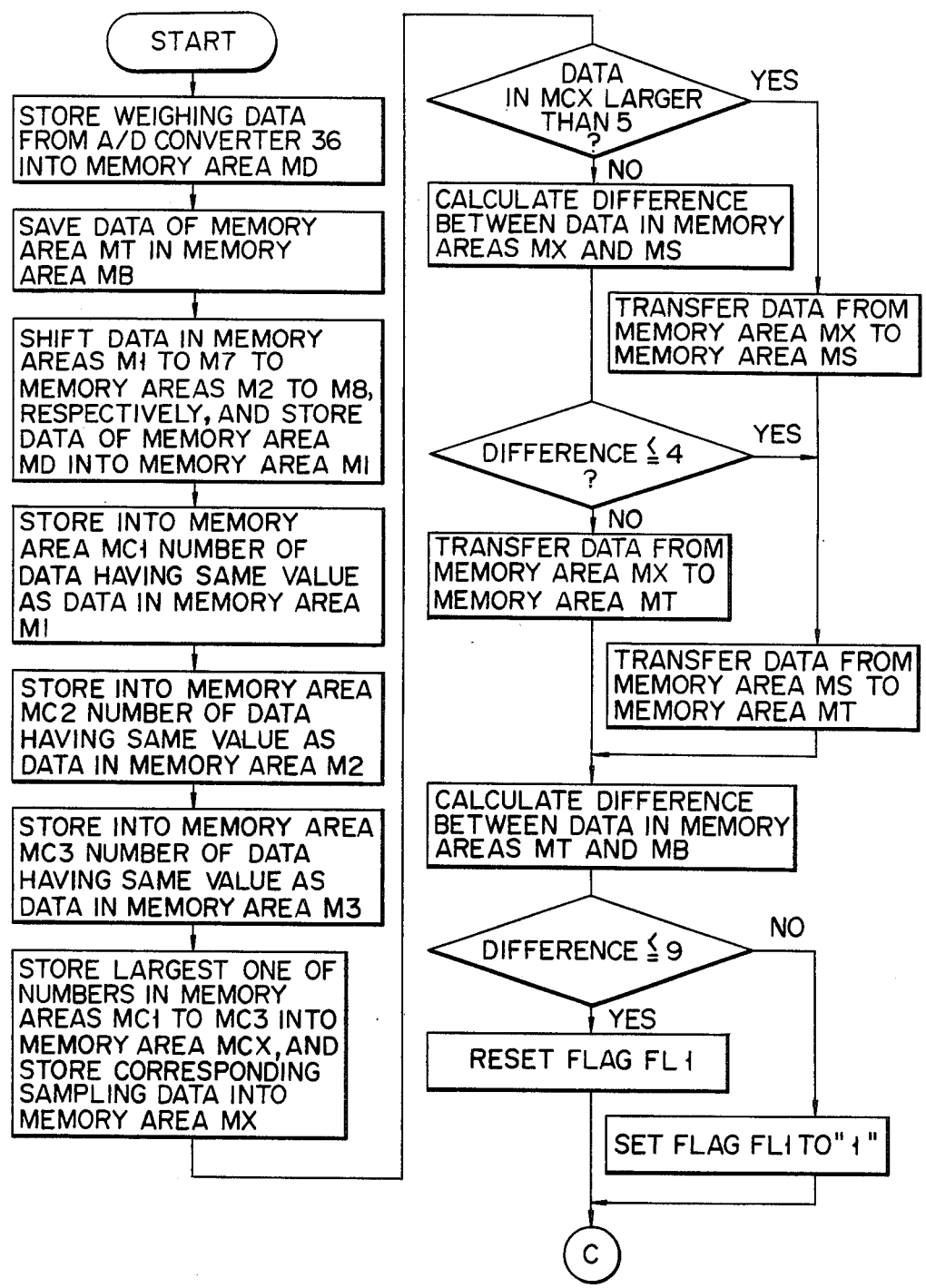
FIGS. 11 and 12 are flowcharts for the display blinking prevention process and display blinking prevention process inhibiting process which are executed by a CPU of the electronic weighing device shown in FIG. 9, respectively.
Figure 12:
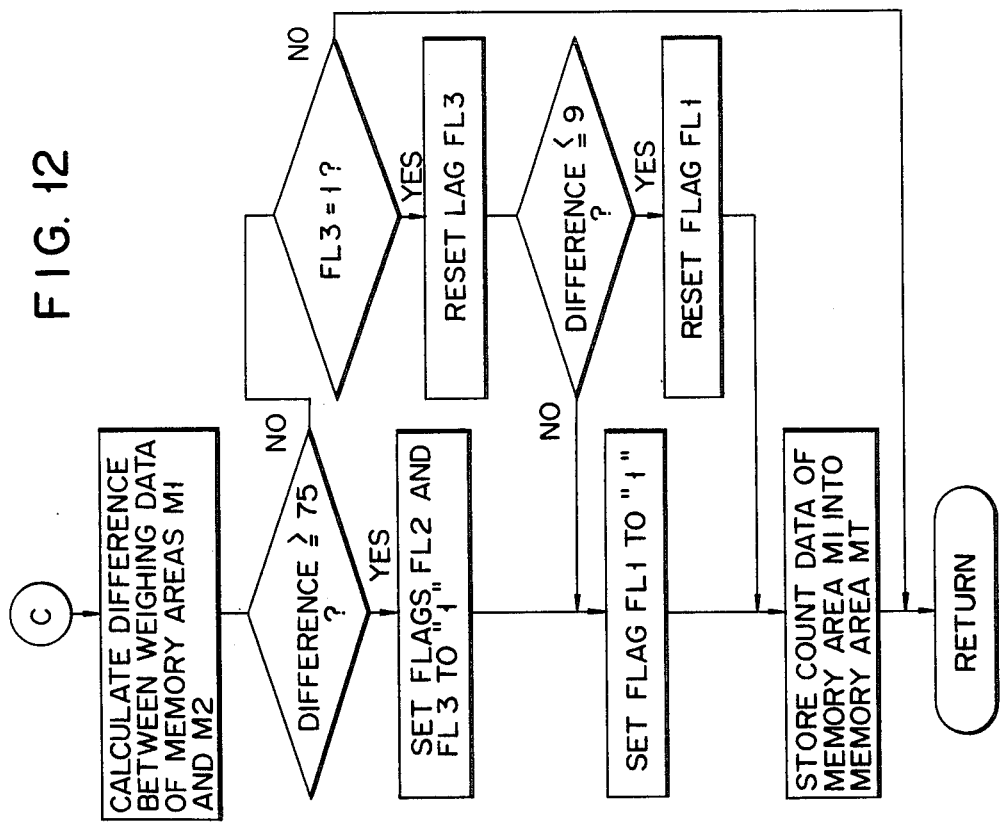

The CPU 30 shown in FIG. 9 also executes the processing operation similar to that shown in FIGS. 4 and 5. Further, this CPU 30 executes the processes shown in FIGS. 11 and 12. Since the process shown in FIG. 11 is substantially the same as the display blinking prevention process shown in FIG. 6, its description is omitted. In the process shown in FIG. 6, the processing routine returns to the main routine after setting the flag FL to "0" or "1" in dependence upon whether the count difference between the weight data in the memory areas MT and MB is below "9" or not. However, in the process shown in FIG. 11, after the flag $FL_1$ was set to "0" or "1", depending upon whether the count difference between the weight data in the memory areas MT and MB is below "9" or not, the process shown in FIG. 12 is further executed.

Figure 13:
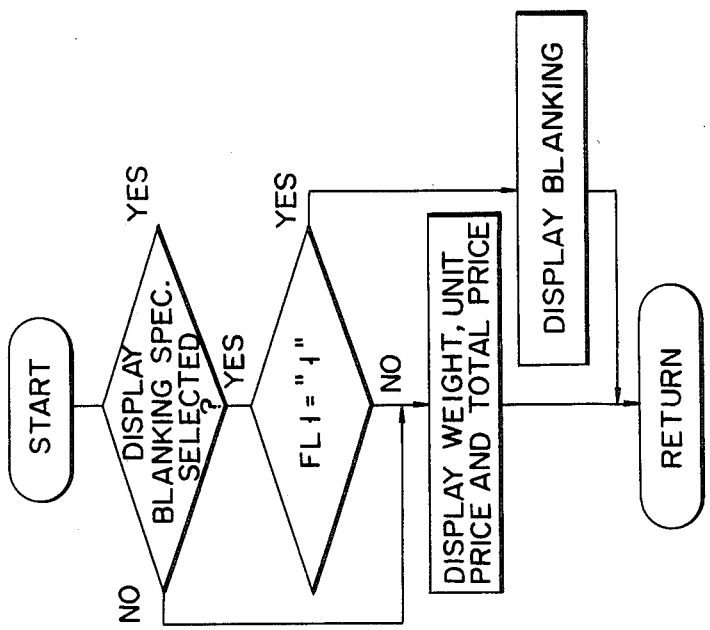
FIG. 13 is a flowchart showing the control of the display blanking.

First, the true value is derived in accordance with the flowchart shown in FIG. 11 and the flag $FL_1$ is set to "0" or "1" in dependence upon whether the difference between the true value stored in the memory area MB which was derived previously and the true value stored at present in the memory area MT is below nine counts or not. Thereafter, the difference between the count value in the memory area $M_1$ in which the newest weight data was stored and the count value in the memory area M2 in which the immediately previous weight data was stored is calculated. A reason for this calculation is to promptly detect the instantaneous weight change by monitoring the newest data. The different processes are executed in dependence upon whether this count difference between the weight data in the memory areas $M_1$ and $M_2$ is over the constant value of 75 counts or not. In the normal condition, this count difference is less than 75 counts and the flag $FL_3$ is set to "0", so that the processing routine is returned to the main routine as shown in FIG. 12. However, when it is detected that the instantaneous weight change of 75 counts or more occurs, the CPU 30 sets the interlock flag $FL_2$ to "1" and determines that a significant weight change occurred and then enables the label to be issued and also sets the interlock state by setting the flag $FL_3$ to "1". Thereafter, the motion flag $FL_1$ is forcedly set to "1" on the basis of the weight variation and the true value obtained in FIG. 11 and stored into the memory area MT is made invalid; instead of this, the content in the memory area $M_1$ is stored as the true value into the memory area MT. In this way, the content of the memory area MT is also changed due to the instantaneous weight change over a predetermined value and the display condition is changed for a short time. Due to this, the weight, unit price and total price, which were changed in response to the changed count value in the memory area $M_1$, are immediately displayed. In this case, the motion flag $FL_1$ is set to "1" and if the blanking display specification has been selected by means of the dip switches 54, as shown in FIG. 13, the display operation is set into the display blanking mode during fluctuation of the weight and the display of the weight, unit price and total price data is inhibited. Namely, there are two kinds of display specifications such as the display mode in that the data such as the weight, unit price, total price, etc. are displayed during the weight fluctuation and the blanking mode in that the display is inhibited during the weight fluctuation. These specifications are set by the dip switches 54. Then, the next sampling is executed and after the true value was obtained by the process in FIG. 11, the process in FIG. 12 is subsequently executed. At this time, since the difference between the weight data in the memory areas $M_1$ and $M_2$ is ordinarily less than 75 counts, the flag $FL_3$ is reset to "0" and the difference between the weight data in the memory areas $M_1$ and $M_2$ is again checked. If this difference is below nine counts, the motion flag $FL_1$ is cleared, thereby enabling the display to be performed. At the same time, the content of the memory area $M_1$ is stored as the true value into the memory area MT. If it is detected in the recheck step that the count difference between the weight data in the memory areas $M_1$ and $M_2$ is over ten counts, the CPU 30 determines that the weight is still fluctuating and then sets the motion flag $FL_1$ to "1" and sets the display blanking mode. At the same time, the CPU 30 stores the content of the memory area $M_1$ as the true value into the memory area MT.

Figure 14:
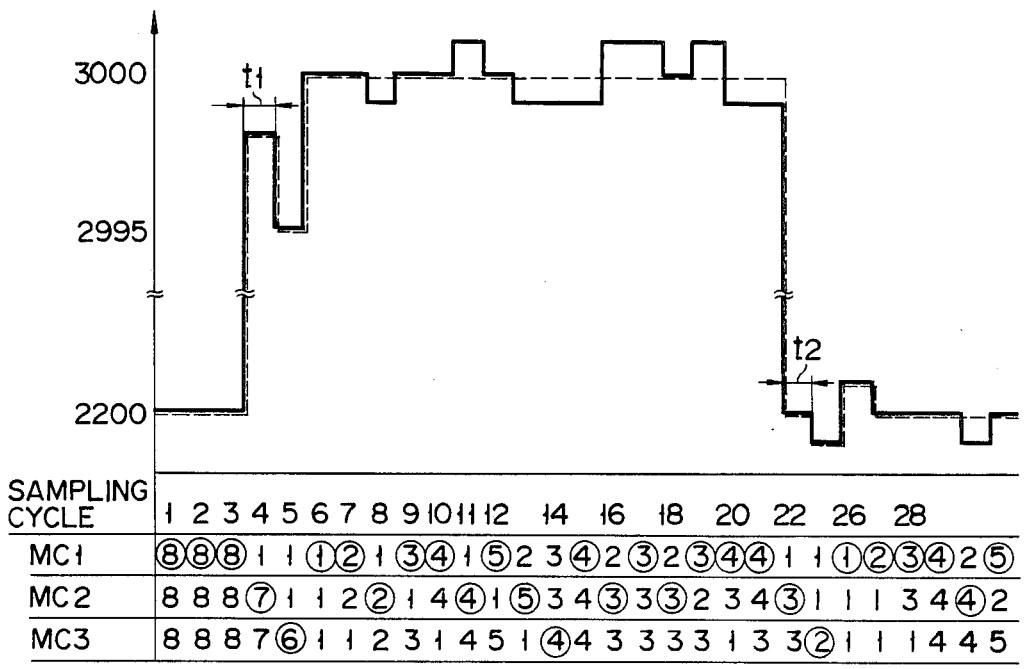
FIGS. 14 and 15 show variations in weighing data and display data in the cases where an article is put on the electronic weighing device and where a load weight is instantaneously applied to this electronic weighing device, respectively.

A practical example of the process shown in FIG. 12 will now be described with reference to FIG. 14. FIG. 14 corresponds to FIG. 7. In addition, it is assumed that the device is set to the display blanking mode during the weight fluctuation by way of the dip switches 54. In the sampling cycle "4" in FIG. 14, the content of the memory area $MC_2$ is stored as the maximum data in the memory area MCX. Also, the true value is set to "2200" by the process in FIG. 11. However, when the count difference between the weight data in the memory areas $M_1$ and $M_2$ is calculated by the process in FIG. 12, since this difference is over 75 counts due to the instantaneous weight change, the flags $FL_2$ and $FL_3$ are together set to "1" and further the flag $FL_1$ is set to "1" and the content of the memory area MT is changed from "2200" to the content "2998" of the memory area Ml. In this case, the flag $FL_1$ has been set to "1", so that the display data is blanked. Time tl denotes this display blanking interval. In the next sampling cycle "5", the true value is first calculated as "2200" by the process in FIG. 11 on the basis of the content of the memory area $MC_3$. Thereafter, the difference between the weight data "2995" in the memory area $M_1$ and the weight data "2998" in the memory area $M_2$ is calculated by the process in FIG. 12. When it is detected that this difference is less than 75 counts, the CPU 30 checks the state of the flag $FL_3$. Since the flag $FL_3$ has been set to "1" in the previous sampling, it is reset to "0" and thereafter the flag $FL_1$ is reset to "0" since the count difference between the weight data in the memory areas $M_1$ and $M_2$ is below nine counts. At the same time, the content of the memory area MT is changed from "2200" to the content "2995" of the memory area $M_1$. Thus, the weight display and the like corresponding to the count data "2995" are performed. In this case, a reason why the flags $FL_2$ and $FL_3$ are together set to "1" due to the instantaneous weight change and the flag $FL_3$ is reset to "0" in the next sampling is that unless this process is performed, for instance, the true value derived on the basis of the memory area $MC_3$ in the sampling cycle "5" will have been displayed as it is and thereby shifting the content of the memory area $M_1$ again into the memory area MT for prevention of this. In the sampling cycle "6" and subsequent cycles in FIG. 14, the count difference between the weight data in the memory areas $M_1$ and $M_2$ is less than 75 counts and the flag $FL_3$ is set to "0", so that the process in FIG. 12 is insignificant and the result of the process shown in FIG. 11 is made effective as it is. Namely, the blinking prevention process is carried out as in a conventional device. In the sampling cycle "22", although the true value is actually "3000" due to the process shown in FIG. 11, the count difference between the weight data in the memory areas $M_1$ and $M_2$ is over 75 counts, so that it is considered that the instantaneous weight change occurred. Consequently, the flags $FL_2$ and $FL_3$ are together set to "1" and the flag $FL_1$ is further also set to "1" and the true value is changed from "3000" to the content "2200" of the memory area $M_1$. In this case, since the flag $FL_1$ has been set to "1", the display data is blanked. Time t2 shows this display blanking interval. In the next sampling cycle "23", the true value is likewise set to "3000" by the process in FIG. 11. However, the count difference between the weight data in the memory areas $M_1$ and $M_2$ is below 74 counts and also the flag $FL_3$ has been set to "1"; thus, the flag $FL_3$ is reset to "0" and the flag $FL_1$ is also reset to "0" and the content "3000" of the memory area MT is also changed to the content "2199" of the memory area $M_1$ at this time. Due to this, the weight and the like corresponding to the content "2199" of the memory area MT are displayed. Thereafter, the processing routine is returned to the process in FIG. 11.

Thus, according to this embodiment, when the instantaneous weight change occurs in the comparison with FIG. 7, the device immediately responds, practically speaking, at a time of two sampling cycles early. This rapid response is indicated due to a change in the display condition. In addition, such an instantaneous weight change over a predetermined value satisfies the label issuing condition, so that the label is issued. However, the display condition is also varied without a time lag in association with the issuing of the label, resulting in improvement in reliability. If the specification to allow the dislay blanking to be performed for the shortest time upon such an instantaneous weight change is adopted and only the data in the stable condition is displayed, the customer will be able to easily see the display data. Although this state depends upon a liking of the customer, the display weight may be changed as it is upon instantaneous weight change due to the change-over of the dip switches 54.

Figure 15:
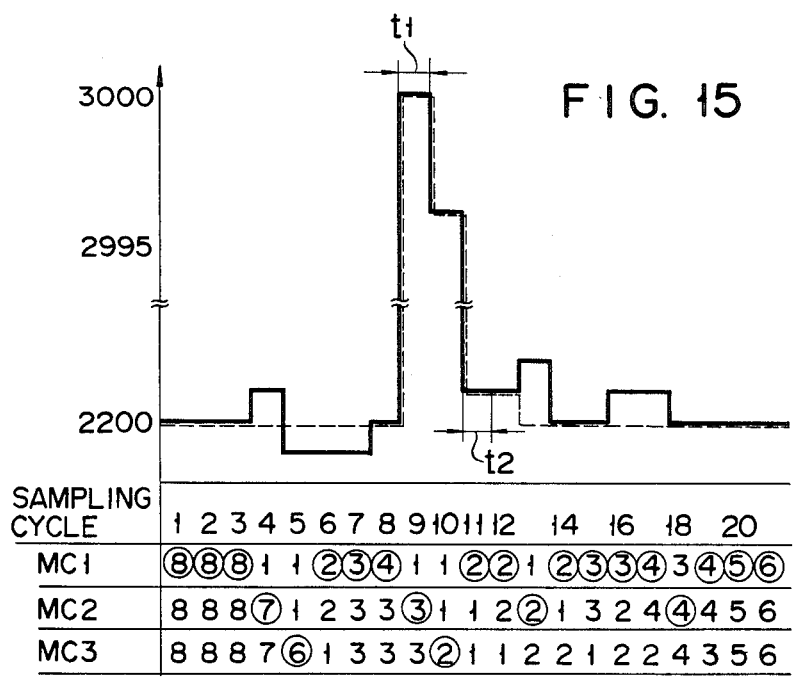

On the other hand, according to this embodiment, as shown in FIG. 15, even in the case where a load is momentarily applied, this electronic weighing device can immediately respond. FIG. 15 corresponds to FIG. 8. In FIG. 15, when even an instantaneous weight change occurs as shown in the sampling cycle "9", the label issuing condition is satisfied and the label is issued. In this case, the true value is first set to "2200" due to the process in FIG. 11. However, since the difference between the count data "3000" in the memory area $M_1$ and the count data "2200" in the memory area $M_2$ is over 75 counts due to the process in FIG. 12, the flags $FL_2$ and $FL_3$ are set to "1" and further the flag $FL_1$ is also set to "1" and thereafter the content of the memory area MT is changed from "2200" to the content "3000" of the memory area $M_1$. In this sampling, since the flag $FL_1$ has been set to "1", the display condition is changed to the blanking condition. Namely, when the label is issued, the display state certainly varies. In the next sampling cycle "10", the true value is first set to "2200" due to the process in FIG. 11. The processing routine advances to the process in FIG. 12 and in this case, the count difference between the count data "2996" in the memory area $M_1$ and the count data "3000" in the memory area $M_2$ is below 74 counts and also the flag $FL_3$ has been set to "1" in the previous sampling cycle; therefore, the flag $FL_3$ is reset to "0" and thereafter the flag $FL_1$ is also reset to "0", thereby enabling the display to be performed and the content "2200" of the memory area MT is also changed to the content "2996" of the memory area $M_1$ Due to this, the weight display and the like corresponding to the true value "2996" are performed. Further, in the sampling cycle "11" as well, the true value is initially calculated as "2200" by the process in FIG. 11. However, since the count difference between the count data "2201" in the memory area $M_1$ and the count data "2996" in the memory area $M_2$ is over 75 counts, the flags $FL_2$ and $FL_3$ are together set to "1" and further the flag $FL_1$ is also set to "1" and the content of the memory area MT is changed from "2200" to the content "2201" of the memory area $M_1$ The display condition in this case is represented as a change into the display blanking state. In the next sampling cycle "12" as well, the true value is initially set to "2200". The count difference between the weight data in the memory areas $M_1$ and $M_2$ is below 74 counts and the flag $FL_3$ has been set to "1" in the previous sampling, so that the flag $FL_3$ is reset to "0" and further the flag $FL_1$ is also reset to "0" and the content of the memory area MT is changed from "2200" to the content "2201" of the memory area $M_1$ Due to this, the weight display and the like corresponding to the content "2201" of the memory area MT are executed. Thereafter, the count difference between the weight data in the memory areas $M_1$ and $M_2$ is below 74 counts and the flag $FL_3$ has been set to "0", so that the process based on FIG. 11 is executed.

As described above, according to this embodiment, in the case where an instantaneous weight fluctuation over a predetermined value occurs, the weight, unit price and total price are displayed in response to the fluctuation in weighing data without performing the display blinking prevention process, so that the weight display can be always and promptly performed in keeping with the fluctuation in load weight. Further, in the case where the load weight varies within a range smaller than the foregoing predetermined value, the display blinking prevention process is similarly executed as in the conventional device, so that the stable weight display is derived.

Moreover, as the label issuing condition, two flags FLA and FLB (not shown) can be used. This flag FLA is set to "1" when the count difference between the weight data in the memory areas $M_1$ and $M_2$ is, e.g., over 75 counts as mentioned above. The flag FLB is set to "1" when it is detected that the true value which is derived in three continuous sampling cycles lies within the range of ten counts in the state whereby the flag FLA has been set to "1". When it is detected that these flags FLA and FLB were set to "1", the data such as the weight, unit price, total price, etc. are printed on the label and this label is issued. After issuing the label, the flags FLA and FLB are reset to "0". In this case, since the display condition certainly changes before issuing the label, the customer cannot be dishorest. Further, in this case, it is possible to easily set by the dip switches 54 whether the display data is blanked or the weighing data is displayed as it is when the count difference between the weight data in the memory areas $M_1$ and $M_2$ is over 75 counts. Therefore, the display condition in accordance with an order of the customer can be adopted.

What is claimed is:

1. An electronic weighing device, comprising:
   weighing means for generating weight data responsive to the weight of a load;
   memory means including a true value memory area and N data memory areas for time sequentially storing the weight data from said weighing means in every one of a plurality of sampling. cycles, where N is more than to:
   display means for displaying at least true value data stored in said true value memory area; and
   control means including:
   means for carrying out a displaying blinking prevention process on the data stored in said N data memory areas;
   means for storing into said true value memory area, after at least two of said sampling cycles, the true value data calculated by processing the weight data stored in said data memory areas in accordance with a display blinking prevention process;
   means for detecting that a difference between the weight data derived in two successive sampling cycles is larger than a first predetermined value; and means for storing into said true value memory area the weight data stored in a preset one of said N data memory areas as the true value data without executing said displaying blinking prevention process when it is detected that a difference between the weight data derived in two successive sampling cycles is larger than a first predetermined value.

2. An electronic weighing device according to claim 1, wherein said memory means has a first flag memory and when it is detected that the difference between the true value data derived in the two successive sampling cycles is a second predetermined value or more, said control means sets a flag into said first flag memory and applied a blanking command to said display means, thereby allowing the display to be blanked.

3. An electronic weighing device according to claim 1, further comprising a label printer coupled to said control means, and wherein said memory means has a first flag memory and when it is detected that the difference between the weight data derived in the two successive sampling cycles is said first predetermined value or more, said control means sets a flag into said first flag memory and also stores the newest weight data into said true value memory area, and when it is detected that the flag is set in the first flag memory and that the true value data derived in a plurality of continuous sampling cycles lies within a predetermined range, said control means applies the printing data corresponding to said true value data to said label printer for printing said printing data on a label and allows a label on which said printing data was printed to be issued and also resets the flag in said first flag memory.

4. An electronic weighing device according to claim 3, wherein said memory means has a second flag memory and when it is detected that the difference between the weight data derived in the two successive sampling cycles is said first predetermined value or more, said control means sets a flag into said second flag memory, and when it is detected that the flag is set into the second flag memory and that the difference between the weight data derived in the two successive sampling cycles is larger than said first predetermined value, said control means resets the flag in the second flag memory and also stores the newest weight data into said true value memory area.

5. An electronic weighing device according to claim 3, wherein said memory means has a second flag memory and when it is detected that the difference between the true value data derived in the two successive sampling cycles is a second predetermined value or more, said control means sets a flag into said second flag memory and applies a blanking command to said display means, thereby allowing the display to be blanked.

6. An electronic weighing device according to claim 5, wherein said memory means has a third flag memory and when it is detected that the difference between the weight data derived in the two successive sampling cycles is said first predetermined value or more, said control means sets a flag into said third flag memory, and when it is detected that the flag is set into the third flag memory and that the difference between the weight data derived in the two successive sampling cycles is less than said first predetermined value, said control means resets the flag in the third flag memory and also stores the newest weight data into said true value memory area.

7. An electronic weighing device, comprising:

weighing means for generating weight data responsive to the weight of a load;

memory means including a true value memory area and N data memory areas for time sequentially storing the weight data from said weighing means in every one of a plurality of sampling cycles, where N is more than two;

display means for displaying at least true value data stored in said true value memory area; and control means including:

means for carrying out a display blinking prevention process on the data stored in said N data memory areas;

means for storing into said true value memory area, after at least two of said sampling cycles, the true value data calculated by processing the weight data storing in said N data memory areas in accordance with a display blinking prevention process; and means for detecting that a difference between the weight data derived in two successive sampling cycles is larger than a first predetermined value; and means for storing into said true value memory area the newest one of weight data stored in said N data memory areas as the true value data without executing said display blinking prevention process when it is detected that a difference between the weight data derived in two successive sampling cycles is larger than a first predetermined value.

8. An electronic weighing device according to claim 7, further comprising a label printer coupled to said control means and controlled by said control means.

9. An electronic weighing device, comprising:

weighing means for generating weight data responsive to the weight of a load;

memory means including a true value memory area and N data memory areas for time sequentially storing the weight data from said weighing means in every one of a plurality of sampling cycles, where N is more than two;

display means for displaying at least true value data stored in said true value memory area; and control means including:

means for effecting a display blinking prevention process by detecting the number of weight data having the same value in said N data memory areas and storing the true value data in the preceding sampling cycle into said true value memory area when it is detected that the number of weight data having the same value is smaller than M ($<N$) and a difference between one of the weight data having the same value and the true value data in the proceding sampling cycle is smaller than a preset value; and means for storing into said true value memory area the true value data calculated by processing the weight data stored in said N data memory areas in accordance with a display blinking prevention process, and for storing into said true value memory area the weight data stored in a preset one of said N data memory areas as the true value data without executing said display blinking prevention process when it is detected that a difference between the weight data derived in two successive sampling cycles is larger than a first predetermined value.

10. An electronic weighing device according to claim 9, further comprising a label printer coupled to said control means and controlled by said control means.

* * * * *